United States Patent [19]

Titcomb et al.

[11] 3,995,065

[45] Nov. 30, 1976

[54] COMPOSITION FOR PREPARING A HIGH COMPLETE PROTEIN WHEAT BREAD

[75] Inventors: Stanley T. Titcomb, Port Chester; Arthur A. Juers, Baldwin, both of N.Y.

[73] Assignee: International Telephone and Telegraph Corporation, Nutley, N.J.

[22] Filed: Sept. 4, 1975

[21] Appl. No.: 610,489

[52] U.S. Cl. .................................. 426/62; 426/23; 426/555
[51] Int. Cl.² .......................................... A23L 1/00
[58] Field of Search ............... 426/23, 62, 656, 653, 426/549, 555

[56] References Cited
UNITED STATES PATENTS

| | | | |
|---|---|---|---|
| 2,989,399 | 6/1961 | Ehle | 426/23 |
| 3,679,433 | 7/1972 | Pomeranz et al. | 426/23 X |
| 3,780,188 | 12/1973 | Tsen et al. | 426/549 |
| 3,851,066 | 11/1974 | Langhans | 426/23 X |

OTHER PUBLICATIONS

Hulse "Protein Enrichment of Bread and Baked Products" (Discussion and Summary) in New Protein Foods (Altschul, editor) vol. 1A, pp. 217–223, 1974.

*Primary Examiner*—Raymond N. Jones
*Attorney, Agent, or Firm*—John T. O'Halloran; Thomas M. Marshall

[57] ABSTRACT

The composition for preparing a high protein wheat bread includes six sources of protein and an amino acid, some of the proteins are complete and others incomplete. This is accomplished by blending the six sources of protein and lysine in critical proportions to give an optimum balance of essential amino acids.

4 Claims, No Drawings

COMPOSITION FOR PREPARING A HIGH COMPLETE PROTEIN WHEAT BREAD

CROSS-REFERENCE TO RELATED APPLICATIONS

This application is related to application Ser. No. 523,642, filed Nov. 14, 1974, entitled "High Complete Protein Bread and Method of Making Same", and assigned to the same assignee of this application. Insofar as the related application is necessary to the instant application, it is incorporated herein by reference.

BACKGROUND OF THE INVENTION

This invention relates to a composition for preparing a high complete protein wheat bread.

Wheat bread is the most consumed bread in the United States next to enriched soft white bread. However, ordinary wheat breads only have in the order of 9.0% to 10% incomplete protein which is less than the PER of 2.5 required of a complete protein. This has been true due to technical problems associated with a commercial bread product such as flavor, grain, texture, appearance, sliceability, and the like. The balanced amino acide profile is critical and slight changes in the bread composition will produce an unacceptable product and, as a result, the bakery industry for many years has failed to produce an acceptable "complete protein" wheat bread. The first success was achieved with white soft bread as described in the related application. However, with the essential changes in formulation required for wheat bread, a new balanced amino acid profile was required and the critical parameters of composition were developed so that the bread produced according to the invention will have 15% complete protein with a PER of 2.5.

SUMMARY OF THE INVENTION

An object of the invention is to provide a high complete protein wheat bread product.

Another object of the invention is to produce a high complete protein-enriched, soft wheat bread having acceptable eating quality, grain, texture, and sliceability.

According to the broader aspects of the invention, the composition for making the high protein wheat bread comprises critically blending six sources of complete and incomplete proteins with lysine to a wheat bread product containing a high and complete protein balance.

DESCRIPTION OF THE PREFERRED EMBODIMENTS

Food proteins are dissimilar with each composed of simpler substances called amino acids, and proteins differ in the amounts and proportions of amino acids they contain. Proteins that incorporate all the essential amino acids in the amount needed by man are called complete proteins while those lacking or containing an insufficient amount of one or more of the essential amino acids are called incomplete proteins. The U.S. recommended daily allowance for complete protein is 45 grams and 65 grams for incomplete proteins. According to the invention, by critically selecting and blending six protein sources and lysine, the optimum balance of essential amino acids was obtained.

The six different proteins were selected and with the amino acid lysine were adjusted to provide the protein source. Some of these proteins are complete and others incomplete (Table I) and are as follows:

TABLE I

| Source of Protein | Preferred Percent of Total Protein | Type |
| --- | --- | --- |
| Wheat | 45.5 | Incomplete |
| Lactalbumin (milk protein) | 20.9 | Complete |
| Soy Protein | 16.9 | Incomplete |
| Casein (milk protein) | 11.0 | Complete |
| Egg | 2.9 | Complete |
| Yeast | 1.8 | Complete |
| Lysine (amino acid) | 1.0 | Incomplete |

A 2 oz. serving of bread made with protein in the above combination provides 20% of the United States Recommended Daily Allowance for protein compared to regular wheat breads which provide only 10% of U.S. RDA in a 2 oz. serving. The formulation of this bread is as follows:

EXAMPLE I

High Complete Protein Wheat Bread

| Ingredients Sponge | Parts by Weight Based on 100 Parts Total Flour | |
| --- | --- | --- |
| | Preferred | Range |
| Wheat flour, patent, enriched | 62.0 | |
| Wheat bran | 8.0 | |
| Wheat gluten | 2.0 | 1.0–3.0 |
| Yeast | 3.0 | |
| Yeast food | 0.625 | |
| Hydrated Mono-and diglycerides | 0.25 | |
| L-lysine hydrochloride | 0.35 | 0.1–0.5 |
| Monocalcium phosphate | 0.25 | |
| Lard or vegetable shortening | 3.00 | |
| Casein | 3.75 | 2.0–6.0 |
| Soy protein isolate | 5.75 | 1.0–7.0 |
| Enrichment "R" (1) | ⅓ tablet | |
| Water | 58 | |

(1) Vitamin and mineral enrichment No. 469 by Paniplus, Kansas City, Mo.

High Complete Protein Wheat Bread

| Ingredients Dough | Parts by Weight Based on 100 Parts Total Flour | |
| --- | --- | --- |
| | Preferred | Range |
| Wheat flour, patent, enriched | 30.0 | |
| Wheat germ | 2.0 | 0.5–3.0 |
| Egg white solids | 1.125 | 0.25–2.25 |
| Lactalbumin | 8.0 | 2.0–13.0 |
| Granulated sugar | 9.0 | |
| Refiners syrup | 3.0 | |
| Calcium propionate | 0.125 | |
| Salt | 2.25 | |
| Yeast | 0.75 | |
| Sodium Stearoyl-2 Lactylate | 0.50 | |
| Calcium sulfate | 0.10 | |
| Water | 25.00 | |

PROCEDURE

Procedure for the above formula is as follows:

1. Combine sponge ingredients and mix 3 minutes in low speed and 1 minute in high speed on a A-120 Hobart Mixer. Temperature is preferably at 73° F. The sponge is fermented for 4 hours in a room kept at 80° F.

2. Make a slurry of the lactalbumin, sugar, refiners syrup, calcium propionate, yeast, calcium sulfate and water.

3. Add the sponge, slurry and dry ingredients to the mixer. Mix the dough 3 minutes in low, 1 minute in high, add salt and mix 2 more minutes in high on a A-120 Hobart Mixer. Dough temperature after mixing is 80° F. and dough fermentation time is 20 minutes. Scale 18-¾ ounce pieces and allow to rest 10 minutes. Shape and place in a pan with top dimensions of 8-½ × 4-½ inches. Proof at 110° F. to ¾ in. above the pan. Bake 21 minutes at 360° to 380° F. Cool and slice.

RESULTS

The resulting loaves were analyzed and evaluated. The high complete protein wheat bread was similar in all respects to a standard enriched wheat bread including quality, specific volume, color, grain and texture, crumb and taste. The results indicated that the formulation did not detract from the standard wheat bread loaf qualities.

EXAMPLE II

The procedure of Example I was repeated for the indicated ranges of protein while keeping the 100% total as required in Table I using adjustments in the protein ingredients according to standard techniques.

The resultant loaves were evaluated and it was determined that they met the requirements for quality with a protein efficiency ratio of 2.5 or greater.

While we have described above the principles of our invention in connection with specific examples and method steps, it is to be clearly understood that the description and examples are made only to enable practicing of the invention and not as a limitation to the scope of the invention as set forth in the objects thereof and in the accompanying claims.

We claim:
1. A composition for preparing a high complete protein wheat bread product comprising in parts by weight based on 100 parts total wheat flour:
   100 parts wheat flour;
   0.5 to 3 parts by weight wheat germ;
   1 to 3 parts by weight wheat gluten;
   0.1 to 0.5 parts by weight L-lysine hydrochloride;
   2 to 6 parts by weight casein;
   1 to 7 parts by weight soy protein isolate;
   0.25 to 2.25 parts by weight egg white solids; and
   2 to 13 parts by weight lactalbumin.

2. A composition for preparing a high complete protein wheat bread product based on 100 parts by weight wheat flour, the composition comprising the combination of:
   100 parts wheat flour;
   about 2 parts by weight of wheat gluten;
   about 2 parts by weight of wheat germ;
   about 3.75 parts by weight of casein;
   about 5.75 parts by weight of soy protein isolate;
   about 1.125 parts by weight of egg white solids;
   about 8 parts by weight of lactalbumin;
   about 0.35 parts by weight L-lysine hydrochloride; and
   about 3.75 parts by weight of yeast, and about 0.625 parts by weight of yeast food.

3. The composition of claim 1 wherein said 100 parts by weight of wheat flour include 8 parts by weight of wheat bran.

4. A formulation for producing a high complete protein wheat bread having a protein efficiency ratio of 2.5 or greater, wherein the percent of total protein consists of a mixture of:
   45.5 percent wheat flour;
   20.9 percent lactalbumin;
   16.9 percent soy protein;
   11.0 percent casein;
   2.9 percent egg white solids;
   1.8 percent yeast; and
   1.0 percent L-lysine hydrochloride.

* * * * *